UNITED STATES PATENT OFFICE.

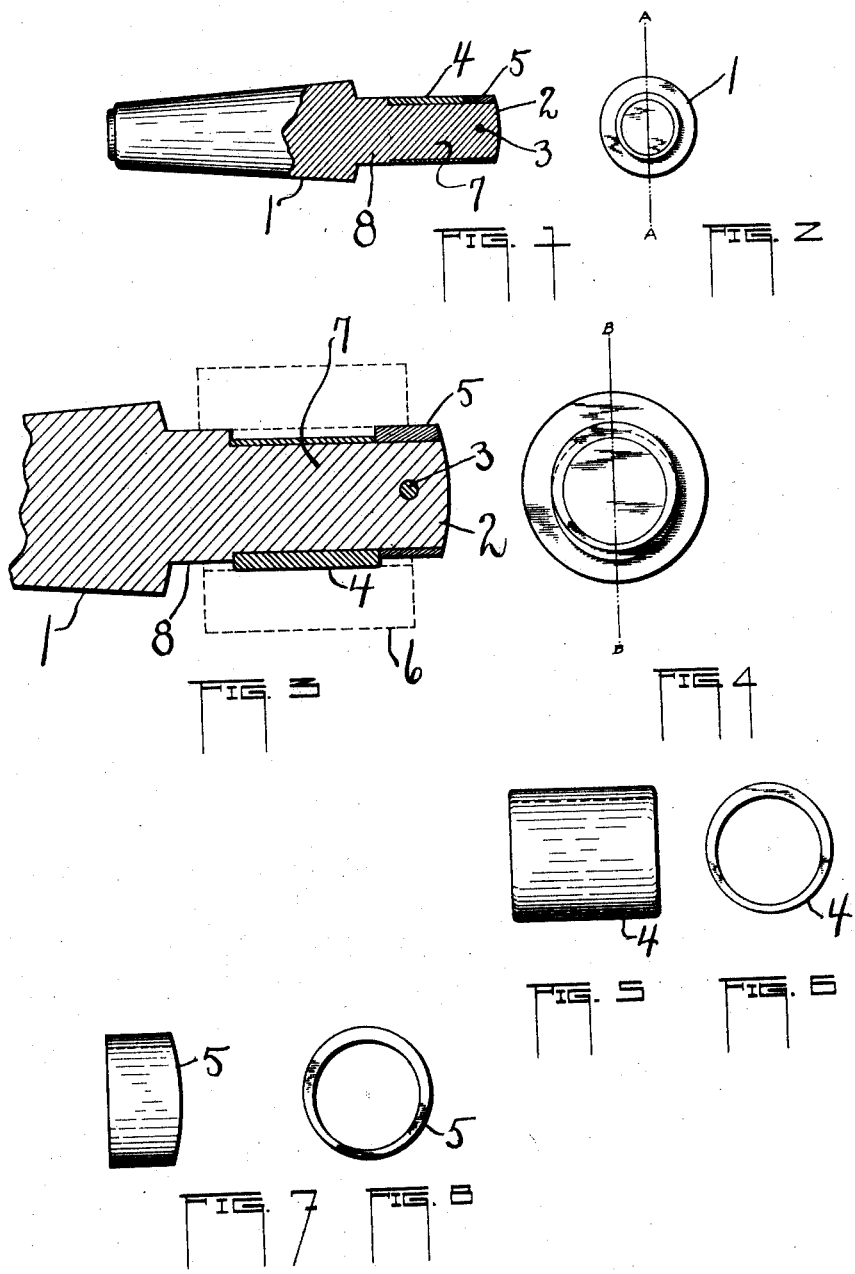

ERIC L. ROHS, OF LA SALLE, ILLINOIS.

ARBOR.

1,401,281.     Specification of Letters Patent.     Patented Dec. 27, 1921.

Application filed July 6, 1920. Serial No. 394,261.

*To all whom it may concern:*

Be it known that I, ERIC L. ROHS, a citizen of the United States, residing in the city of La Salle, county of La Salle, and State of Illinois, have invented certain new and useful Improvements in Arbors, of which the following is a specification.

My invention relates to self-locking and automatic arbors and has for its object the production of an arbor, on which the work to be operated is placed, and an attempt to either rotate the work or the arbor immediately automatically locks them both together. I accomplish these objects by the means shown in the accompanying drawings, in which—

Figure 1 shows my arbor in part cross section on line AA, ready to receive the work to be operated on.

Fig. 2 is an end view of Fig. 1.

Fig. 3 is a cross-sectional view of my arbor along a line BB of Fig. 4, showing the work locked on the arbor.

Fig. 4 is an end view of Fig. 3.

Fig. 5 is a front view of the locking part of my arbor.

Fig. 6 is an end view of Fig. 5.

Fig. 7 is a front view of the stationary collar on my arbor.

Fig. 8 is an end view of Fig. 7.

Similar numerals refer to similar parts throughout the several views. In the drawings 1 represents the part of my arbor whereby it is fastened into the regular machinist's lathe or other machine and is generally made tapered, as shown, for convenience in operation, although it may be made of any other suitable or convenient shape. 2 is a cylindrical projection from 1 having a portion 8 which is concentric with 1 and a cylindrical portion 7 which is eccentric with both 1 and 8. Rotatably mounted on 7 is an eccentric bushing 4 of such proportion that when it is in the position shown in Fig. 1, the exposed cylindrical surface is continuous with the part 8, and when it is in the position shown in Fig. 2, it projects beyond the cylindrical surface 8, as shown, so that it will then grasp the sides of the hole shown in the indicated piece of work 6. Trying to turn the work 6 in the direction which tends to make it project farther over 8 simply locks the work harder, while turning the work 6 in the opposite direction, to make entire arbor conform to Fig. 1, will make the work loose, so that it can be removed. 5 is an eccentric collar similar to eccentric 4, which is fastened to 7 by means of a pin 2, so that its outer cylindrical surface is concentric with that of 8, still leaving sufficient clearance so that 4 can rotate readily.

In operation a round hole is put in the work, slightly larger than the diameter of part 8 and bushing 4 is turned in position shown in Fig. 1 and the work slipped on and when the arbor is rotated, it is evident that the work is locked instantly.

While I have here shown one form of my arbor, I do not wish to limit myself to the exact form shown, but wish to have it taken in a sense illustrative of one of the many different forms set forth in my claims.

I claim—

1. In an automatic arbor, a holding part, a larger cylindrical part, integral with said holding part, a smaller auxiliary cylindrical part integral with and eccentric with said larger cylindrical part and an eccentric collar rotatably mounted on said smaller cylindrical part.

2. In an automatic arbor, a holding part, a larger cylindrical part, integral with said holding part, a smaller auxiliary cylindrical part integral with and eccentric with said larger cylindrical part and an eccentric collar fastened on said small cylindrical part adjacent to said collar.

3. In an automatic arbor, a member, a larger cylindrical part integral with said member, a smaller cylindrical projecting part, eccentric with said larger cylindrical part and integral therewith, an eccentric collar rotatably mounted on said smaller cylindrical part and a similar eccentric collar fastened to said small cylindrical part, adjacent to said collar.

4. In an arbor, a member, a larger cylindrical part integral with said member, a smaller cylindrical projecting part, eccentric with said larger cylindrical part and integral therewith, an eccentric collar rotatably mounted on said smaller cylindrical part and a similar eccentric collar fastened to said small cylindrical part, adjacent to said collar.

ERIC L. ROHS.

Witnesses:
F. M. PLAGENS,
C. A. LINDENMEYER.